Nov. 4, 1930.  W. R. HENDRIX  1,780,589
WATER REGULATING DEVICE
Filed March 21, 1927
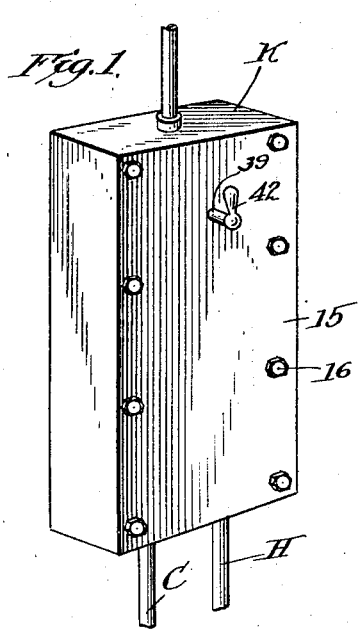
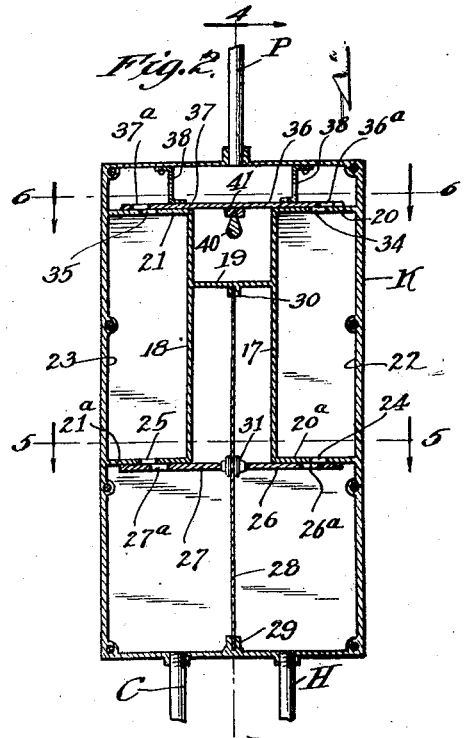
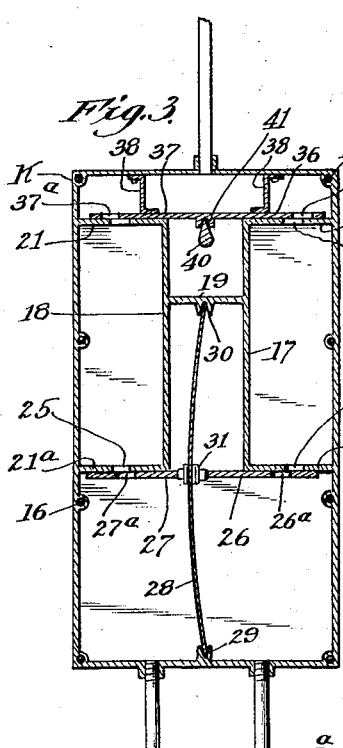
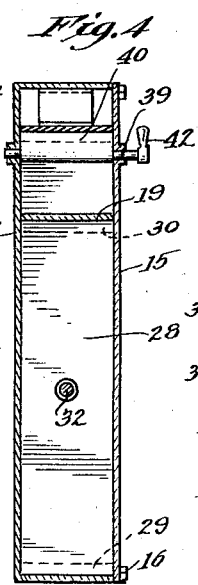
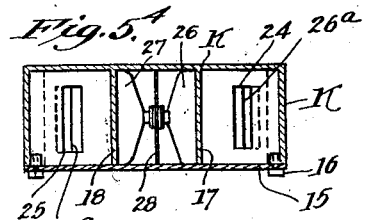
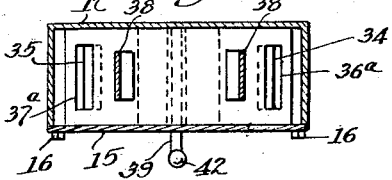
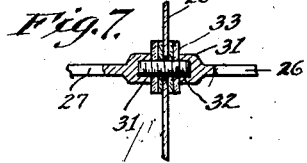
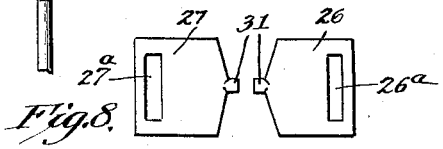
INVENTOR
William R. Hendrix.
BY Munn & Co.
ATTORNEY Patented Nov. 4, 1930

1,780,589

UNITED STATES PATENT OFFICE

WILLIAM R. HENDRIX, OF PACIFIC PALISADES, CALIFORNIA, ASSIGNOR OF ONE-HALF TO HOWARD A. HYDE, OF SANTA MONICA, CALIFORNIA

WATER-REGULATING DEVICE

Application filed March 21, 1927. Serial No. 177,075.

My invention relates to a device designed for use in hot and cold water lines where the lines lead to a mixing faucet from which water at any desired temperature is discharged and in accordance with the relative amounts of hot and cold water as determined by an adjustment of the two valves embodied in the faucet.

Under the present type of plumbing, the pressure in hot and cold water lines is the same, so that should there occur any decrease in pressure in either line, such as when dispensing water from some other faucet in the system, the pressures will become unbalanced, thereby increasing or decreasing the temperature of the resultant mixture at the faucet, depending upon whether the hot or cold water line is being tapped.

It is a purpose of my invention to provide a relatively simple device capable of being interposed in the hot and cold water lines and operating automatically to regulate the amounts of hot and cold water delivered to the mixing faucet in such manner that irrespective of a reduction in pressure of either the hot or cold water where the pressures of the two are normally the same, the relative amounts delivered by the device remain the same, thereby maintaining the temperature of the resultant mixture constant in accordance with an adjustment of the mixing faucet valves.

It is also a purpose of my invention to provide a water regulating device as described which is further characterized by the incorporation therein of a single manually operable means for a pair of valves which latter function to control the respective quantities of hot and cold water passing through the mixing faucet in accordance with the adjustment thereof by the manually operable means.

I will describe only one form of water regulating device embodying my invention and will then point out the novel features thereof in claims.

In the accompanying drawings,

Figure 1 is a view showing in perspective one form of water regulating device embodying my invention in applied position to the hot and cold water lines of a plumbing system;

Figure 2 is a view showing in vertical section the device shown in Figure 1;

Figure 3 is a view similar to Figure 2, showing another position which the control valves of the device are capable of occupying;

Figure 4 is a vertical sectional view taken on the line 4—4 of Figure 2;

Figures 5 and 6 are horizontal sectional views taken on the lines 5—5 and 6—6, respectively, of Figure 2;

Figure 7 is an enlarged fragmentary sectional view showing the connections of the control valves with the diaphragm of the device;

Figure 8 is a view showing in plan the two control valves of the device.

Referring specifically to the drawings, my invention, in its present embodiment, comprises a container K of box-like form having a cover plate 15 secured in closing position by means of screw bolts 16. As shown in Figure 2, the container is provided interiorly with vertical partitions 17 and 18 spaced apart in parallelism and connected by a horizontal partition 19, the opposite ends of the partitions being extended and bent at right angles to form respectively horizontal partitions 20, 20ª and 21 and 21ª. It will be understood that these several partitions are welded or otherwise secured to the inner walls of the container to occupy fixed positions therein and to divide the container interiorly into chambers 22 and 23.

The partitions 20ª and 21ª are provided with ports 24 and 25 respectively, and the passage of water through these ports is controlled by a pair of valves 26 and 27, respectively, having ports 26ª and 27ª. The valves 26 and 27 are adapted to be actuated by a diaphragm 28 or any other suitable element which is responsive to water pressures. This diaphragm as shown in Figure 4 is of elongated form with its lower end mounted in the bottom wall of the container, as indicated at 29, and its upper end mounted in the partition 19 as indicated at 30. The construction of the valves 26 and 27 is clearly illustrated in Figure 8, and they are provided at their confronting ends with sockets 31 which, as shown in Figure 7, are interiorly threaded to receive the opposite ends of a connecting stud 32 which extends through the diaphragm 28 and carries a plurality of washers 33 to seal the opening in the diaphragm through which the stud extends.

The partitions 20 and 21 are provided with ports 34 and 35, respectively, controlled by a pair of valves 36 and 37 having ports $36^a$ and $37^a$ adapted to register with ports 34 and 35. These valves 36 and 37 are constructed from a single length of flat metal or other suitable material mounted to slide on the partitions 20 and 21 and beneath a pair of guide brackets 38 secured to and depending from the upper end of the container. The valves are actuated manually through the medium of a single means which comprises, in the present instance, a shaft 39 journaled in the container, as clearly illustrated in Figure 4, and provided with an elongated arm 40 engaging within a grooved extension 41 on the under side of the plate constituting the valves 36 and 37. The shaft 39 extends exteriorly of the container where it is provided with a handle 42 by which the arm 40 can be partly rotated in one direction or the other to operate the valves 36 and 37.

The ports 34 and 35 and the valves 36 and 37, together with their operating means, constitute a mixing faucet, and the compartment formed between the partitions 20 and 21 and the upper end of the container constitutes a chamber in which mixing of the hot and cold waters takes place incident to the discharge of the mixture from the container.

In practice, the hot and cold water lines H and C of a plumbing system are connected to the bottom of the container as illustrated in Figure 2, so as to discharge water into the container at opposite sides of the diaphragm 28. The upper end of the container is connected to an outlet pipe P which may lead to a discharge nozzle, such as the spray nozzle of a shower.

With the pressures of the hot and cold liquids the same as is the normal condition in a plumbing system, it will be clear that the liquids delivered to the container from the pipes C and H will exert equal pressures upon opposite sides of the diaphragm 28, thereby normally maintaining the latter in an unflexed or perpendicular position, as illustrated in Figure 2. In this normal position of the diaphragm the ports $26^a$ and $27^a$ are in such positions that the ports 24 and 25 are only half open. Thus only half of the water delivered to the bottom of the container is permitted to pass through the ports 24 and 25 upwardly into the chambers 22 and 23, the flow of water from these chambers being controlled respectively by an adjustment of the mixing valves 36 and 37. Thus, it will be seen that the respective amounts of hot and cold water delivered to the mixing chamber can be varied in accordance with a manual manipulation of the shaft 37. The arrangement of the ports $36^a$ and $37^a$ with respect to the ports 34 and 35 is such that when the shaft 39 is rotated in one direction or the other the closing of one port 34 or 35 and the opening of the other will be effected, depending upon the direction of rotation of the shaft. For example, in opening the cold water port 35 the hot water port 34 closes. In this manner, a rapid variation in the respective flows of hot and cold water to the mixing chamber can be effected, so that the temperature of the resultant mixtures finally discharged into the pipe P can be controlled at will.

As long as the pressures of hot and cold water delivered to the container from the pipes H and C remain the same, the control valves 26 and 27 occupy the position shown in Figure 2, so that the flow of the two liquids to the mixing faucet is the same. However, should there be a reduction in pressure of either liquid as occurs when dispensing water from some other point in either line, the pressures will become unbalanced, thereby causing the diaphragm 28 to be flexed in one direction or the other, depending upon which liquid is reduced in pressure. For example, let us assume that the cold water is reduced in pressure, the diaphragm will be flexed to the left as when viewed in Figure 3, thereby moving the control valves 26 and 27 to the left, so as to cause a further opening of the port 25 and a closing of the port 24. The degree of movements of the valves 26 and 27 is, of course, dependent upon the degree of flexing of the diaphragm 28 and the latter, in turn, is controlled by the degree of reduction of pressure of the cold water. By this operation, it will be clear that the quantity of water flowing through the port 25 will be increased as the pressure is decreased, but not in direct proportion. The difference in flow of water to the chamber 23 due to reduction in pressure of the water supplied to the container, although being in part compensated for by further opening of the port 25, is compensated for in full by the partial closing of the port 24 to reduce the amount of hot water passing to the chamber 22. In this manner, the original relative proportions of hot and cold water delivered to the chambers 22 and 23 is maintained in spite of the reduction in pressure of the cold water. It will be understood that a like regulation is effected when there is a reduction in pressure of the hot water through flexing of the diaphragm in the opposite direction from that shown in Figure 3.

From the foregoing description, it will be manifest that I have provided a water regulating device which when interposed in hot and cold water lines functions to automatically maintain the relative proportions of hot and cold water at all times the same irrespective of reduction in pressure of either liquid. Through this automatic control, the mixing faucet having been once adjusted to obtain a discharging mixture of a desired temperature, such temperature will not vary because of any decrease in pressure of either liquid. My invention is particularly useful in connection with showers where it is highly desirable to eliminate any variations in temperature of the water after a desired temperature has been once obtained.

Although I have herein shown and described only one form of water regulating device embodying my invention, it is to be understood that various changes and modifications may be made therein without departing from the spirit of the invention and the spirit and scope of the appended claims.

I claim as my invention:

1. A water regulating device of the character described comprising a container adapted for connection to hot and cold water lines, ports in the container through which the respective liquids are adapted to flow, slide valves controlling said ports, a diaphragm positioned in the container to respond to any reduction in pressure of either liquid as supplied to the container to actuate said valves in a manner to maintain constant the original relative proportions of liquids flowing through said ports, a mixing chamber in the container, and a manually reciprocable slide valve in the container controlling the flow of the two liquids to said chamber whereby the temperature of the mixture can be varied as desired.

2. A water regulating device comprising a container having an open side, a cover closing said open side, partitions within the container dividing the latter into chambers and provided with ports, a diaphragm mounted in the container, and slide valves operatively connected to the diaphragm and having ports adapted to register with the first ports to control the passage of water through the first ports in accordance with the position of the diaphragm.

3. A water regulating device comprising a container having an open side, a cover closing said open side, longitudinal partitions in the container, a transverse partition connecting the longitudinal partitions between the ends thereof, other transverse partitions at one end of the longitudinal partitions coacting with the former to provide a chamber and formed with ports, a diaphragm secured within the container to divide said chamber into two compartments, water supply pipes for each of the compartments, and valves operatively connected to the diaphragm and having ports adapted to register with the first ports and operable through the diaphragm to control the passage of water through said compartments.

WILLIAM R. HENDRIX.